United States Patent
Comparan et al.

(10) Patent No.: US 9,354,884 B2
(45) Date of Patent: May 31, 2016

(54) PROCESSOR WITH HYBRID PIPELINE CAPABLE OF OPERATING IN OUT-OF-ORDER AND IN-ORDER MODES

(71) Applicant: International Business Machines Corporation, Armonk, NY (US)

(72) Inventors: Miguel Comparan, Kirkland, WA (US); Andrew D. Hilton, Durham, NC (US); Hans M. Jacobson, White Plains, NY (US); Brian M. Rogers, Durham, NC (US); Robert A. Shearer, Woodinville, WA (US); Ken V. Vu, Cary, NC (US); Alfred T. Watson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 13/801,503

(22) Filed: Mar. 13, 2013

(65) Prior Publication Data

US 2014/0281402 A1 Sep. 18, 2014

(51) Int. Cl.
*G06F 9/30* (2006.01)
*G06F 9/38* (2006.01)

(52) U.S. Cl.
CPC ............ *G06F 9/30189* (2013.01); *G06F 9/384* (2013.01); *G06F 9/3836* (2013.01);
(Continued)

(58) Field of Classification Search
CPC . G06F 1/3287; G06F 9/3836; G06F 9/30189; G06F 9/384; G06F 9/3842; G06F 9/3851; G06F 9/3861; G06F 9/3869; G06F 9/3873
See application file for complete search history.

(56) References Cited

U.S. PATENT DOCUMENTS 5,392,437 A * 2/1995 Matter .................. G06F 9/3885
712/E9.069
6,775,756 B1 8/2004 Thusoo et al.
(Continued)

FOREIGN PATENT DOCUMENTS

DE EP 1217514 A2 * 6/2002 ............ G06F 9/3836
JP 2009037608 A * 2/2009 ................ G06F 9/30

OTHER PUBLICATIONS

Girish Venkataramani, Tiberiu Chelcea, and Seth C. Goldstein. 2008. Heterogeneous Latch-Based Asynchronous Pipelines. In Proceedings of the 2008 14th IEEE International Symposium on Asynchronous Circuits and Systems (ASYNC '08). IEEE Computer Society, Washington, DC, USA, 83-92. DOI=10.1109/ASYNC.2008.21 http://dx.doi.org/10.1109/ASYNC.2008.21.*

(Continued)

*Primary Examiner* — William B Partridge
*Assistant Examiner* — William Nguyen
(74) *Attorney, Agent, or Firm* — Middleton Reutlinger

(57) ABSTRACT

A method and circuit arrangement provide support for a hybrid pipeline that dynamically switches between out-of-order and in-order modes. The hybrid pipeline may selectively execute instructions from at least one instruction stream that require the high performance capabilities provided by out-of-order processing in the out-of-order mode. The hybrid pipeline may also execute instructions that have strict power requirements in the in-order mode where the in-order mode conserves more power compared to the out-of-order mode. Each stage in the hybrid pipeline may be activated and fully functional when the hybrid pipeline is in the out-of-order mode. However, stages in the hybrid pipeline not used for the in-order mode may be deactivated and bypassed by the instructions when the hybrid pipeline dynamically switches from the out-of-order mode to the in-order mode. The deactivated stages may then be reactivated when the hybrid pipeline dynamically switches from the in-order mode to the out-of-order mode.

22 Claims, 11 Drawing Sheets

(52) U.S. Cl.
CPC ............ *G06F 9/3842* (2013.01); *G06F 9/3851* (2013.01); *G06F 9/3861* (2013.01); *G06F 9/3869* (2013.01); *G06F 9/3873* (2013.01)

(56) References Cited

U.S. PATENT DOCUMENTS

| | | | |
|---|---|---|---|
| 7,818,545 | B2 | 10/2010 | Miura et al. |
| 2003/0163671 | A1* | 8/2003 | Gschwind ............. G06F 9/3836 712/214 |
| 2009/0019265 | A1 | 1/2009 | Correale, Jr. et al. |
| 2009/0187753 | A1* | 7/2009 | Gelman ................ G06F 1/3293 713/2 |
| 2010/0131742 | A1* | 5/2010 | Col ....................... G06F 9/3842 712/220 |
| 2011/0271126 | A1 | 11/2011 | Hill |

OTHER PUBLICATIONS

Ghiasi, Soraya, Jason Casmira, and Dirk Grunwald. "Using IPC variation in workloads with externally specified rates to reduce power consumption." Workshop on Complexity Effective Design. 2000.*

H. Najaf-Abadi et al., "Architectural Contesting," 978-1-4244-2932-5/08, 2008 IEEE, pp. 189-200.

D. Tarjan et al., "Federation: Repurposing Scalar Cores for Out-of-Order Instruction Issue," University of Virginia, Department of Computer Science, 2008, pp. 772-775.

R. Kumar et al., "Heterogeneous Chip Multiprocessors," IEEE Computer Society 0018-9162/05, 2005, pp. 32-38.

M. Valluri, "A Hybrid-Scheduling Approach for Energy-Efficient Superscalar Processors," Dissertation Presented to the Faculty of the Graduate School of The University of Texas at Austin, May 2005 (156 pages).

* cited by examiner

1100

```
┌─────────────────────────────────────┐
│ A method to facilitate operation    │
│ for a hybrid pipeline to execute at │
│ least one instruction stream using  │
│ out-of-order processing and         │
│ in-order processing.                │
└─────────────────────────────────────┘
                  │
                  ▼
┌─────────────────────────────────────┐
│ Execute, by the hybrid pipeline,    │  1110
│ at least one instruction stream     │
│ where the hybrid pipeline includes  │
│ a plurality of stages.              │
└─────────────────────────────────────┘
                  │
                  ▼
┌─────────────────────────────────────┐
│ Dispatch instructions to an issue   │  1120
│ queue when the hybrid pipeline is   │
│ in an out-of-order mode.            │
└─────────────────────────────────────┘
                  │
                  ▼
┌─────────────────────────────────────┐
│ Bypass the issue queue when the     │  1130
│ hybrid pipeline is in an in-order   │
│ mode.                               │
└─────────────────────────────────────┘
                  │
                  ▼
┌─────────────────────────────────────┐
│ Dynamically switch the hybrid       │  1140
│ pipeline between the out-of-order   │
│ and the in-order modes to           │
│ selectively execute instructions    │
│ from the at least one instruction   │
│ stream using out-of-order and       │
│ in-order pipeline processing.       │
└─────────────────────────────────────┘
```

FIG. 11

PROCESSOR WITH HYBRID PIPELINE CAPABLE OF OPERATING IN OUT-OF-ORDER AND IN-ORDER MODES

FIELD OF THE INVENTION

The invention is generally related to data processing, and in particular to processor architectures and pipelines utilized therein.

BACKGROUND OF THE INVENTION

Conventional computer processor architectures are typically pipelined to increase throughput. Pipelining is used to break the execution of instructions into a plurality of stages so that different instructions can be processed by different stages at the same time. Processor pipeline designs can be broadly classified into one of two categories: out-of-order pipelines and in-order pipelines.

Conventional out-of-order pipeline designs are usually used in high-performance applications. Conventional out-of-order pipeline designs have the capability to issue multiple instructions per cycle, and are capable of completing instructions out of order so that a processor can continue to execute instructions even while a long latency event is being handled for other instructions, such as due to a data cache miss by a prior instruction. This higher performance, however, comes with a significant tradeoff in terms of power consumption. Several functional units included in a conventional out-of-order pipeline design that are required to support the execution of instructions in an out-of-order fashion typically consume a significant amount of power. Certain applications benefit significantly from the use of out-of-order pipelining, so the increased power cost may be justified for those applications. However, other applications may not benefit sufficiently from out-of-order pipelining to justify the increased power cost associated with such designs.

Conventional in-order pipeline designs are typically a better choice for applications where power-efficiency rather than high performance is the primary goal. Processors supported by in-order pipelines typically have lower performance than processors supported by out-of-order pipelines. However, the functional units that are required to manage out-of-order pipelining are typically not required in-order pipeline designs, and as a result, in-order pipeline-based designs typically consume much less power than comparable out-of-order pipeline-based designs.

Processor designers are therefore typically forced to choose from between in-order and out-of-order pipelines based upon the expected workloads and power requirements of particular processor designs. Where a particular processor design is instead used to handle workloads that are better suited for the other type of pipeline, performance suffers.

With the ability to incorporate multiple processing cores on the same processor chip, however, it is also possible to incorporate both types of pipelines in the same processor design. With such a design, heterogeneous processing cores are integrated onto the same chip so that applications that are best suited for a particular type of pipeline are executed on processing cores best suited for such applications. However, where an application has different portions that are better suited for different pipeline designs, moving an application between different processing cores often introduces a significant latency overhead, thereby limiting the frequency and benefits of migration for many applications.

Another conventional approach includes simultaneously executing several copies of an application on both on a processing core with an out-of-order pipeline and a processing core with an in-order pipeline, so that different portions of an application that are better suited for one type of pipeline will be executed by the processing core having that type of pipeline. This conventional approach, however, is not energy efficient because multiple processing cores are executing redundant copies of the same application. In addition, resources that could have otherwise been used to execute other applications are tied up handling the redundant execution, so overall performance is reduced.

A need therefore continues to exist in the art for an improved manner of efficiently supporting both in-order and out-of-order pipelining for different workloads.

SUMMARY OF THE INVENTION

The invention addresses these and other problems associated with the prior art by providing a method and system that utilize a hybrid pipeline to execute at least one instruction stream using out-of-order processing and in-order processing. In many embodiments consistent with the invention, the hybrid pipeline is operable in both an out-of-order mode and an in-order mode. Doing so may enable the hybrid pipeline to dynamically switch between the out-of-order and in-order modes to selectively execute instructions from instruction streams using out-of-order and in-order pipeline processing as desired for each instruction stream or portion thereof.

Therefore, consistent with one aspect of the invention, a circuit arrangement includes a hybrid pipeline including a plurality of pipeline stages configured to execute at least one instruction stream. The plurality of pipeline stages includes a dispatch stage configured to dispatch instructions to an issue queue when the hybrid pipeline is in an out-of-order mode and to bypass the issue queue when the hybrid pipeline is in an in-order mode. The circuit arrangement also includes control logic coupled to the hybrid pipeline and configured to dynamically switch the hybrid pipeline between the out-of-order and in-order modes to selectively execute instructions from at least one instruction stream using out-of-order and in-order pipeline processing.

Further features and advantages of the invention, as well as the structure and operation of various embodiments of the invention, are described in detail below with reference to the accompanying drawings. The invention is not limited to the specific embodiments described herein. The embodiments are presented for illustrative purposes only and so that readers will have multiple views enabling better perception of the invention, which is broader than any particular embodiment. Additional embodiments will be apparent to persons skilled in the relevant art(s) based on the teachings set forth in this patent document.

BRIEF DESCRIPTION OF THE DRAWINGS

The accompanying drawings, which are incorporated herein and form part of the specification, illustrate the present invention and, together with the description, further serve to explain the principles of the present invention and to enable a person skilled in the pertinent art to make and use the present invention. Various embodiments of the present invention are described below with reference to the drawings, wherein like reference numerals are used to refer to like elements throughout.

FIG. 11 shows a flow chart illustrating a method for a hybrid pipeline that dynamically switches between out-of-order mode and in-order mode, in accordance with embodiments of the present invention.

DETAILED DESCRIPTION

Figure 1:
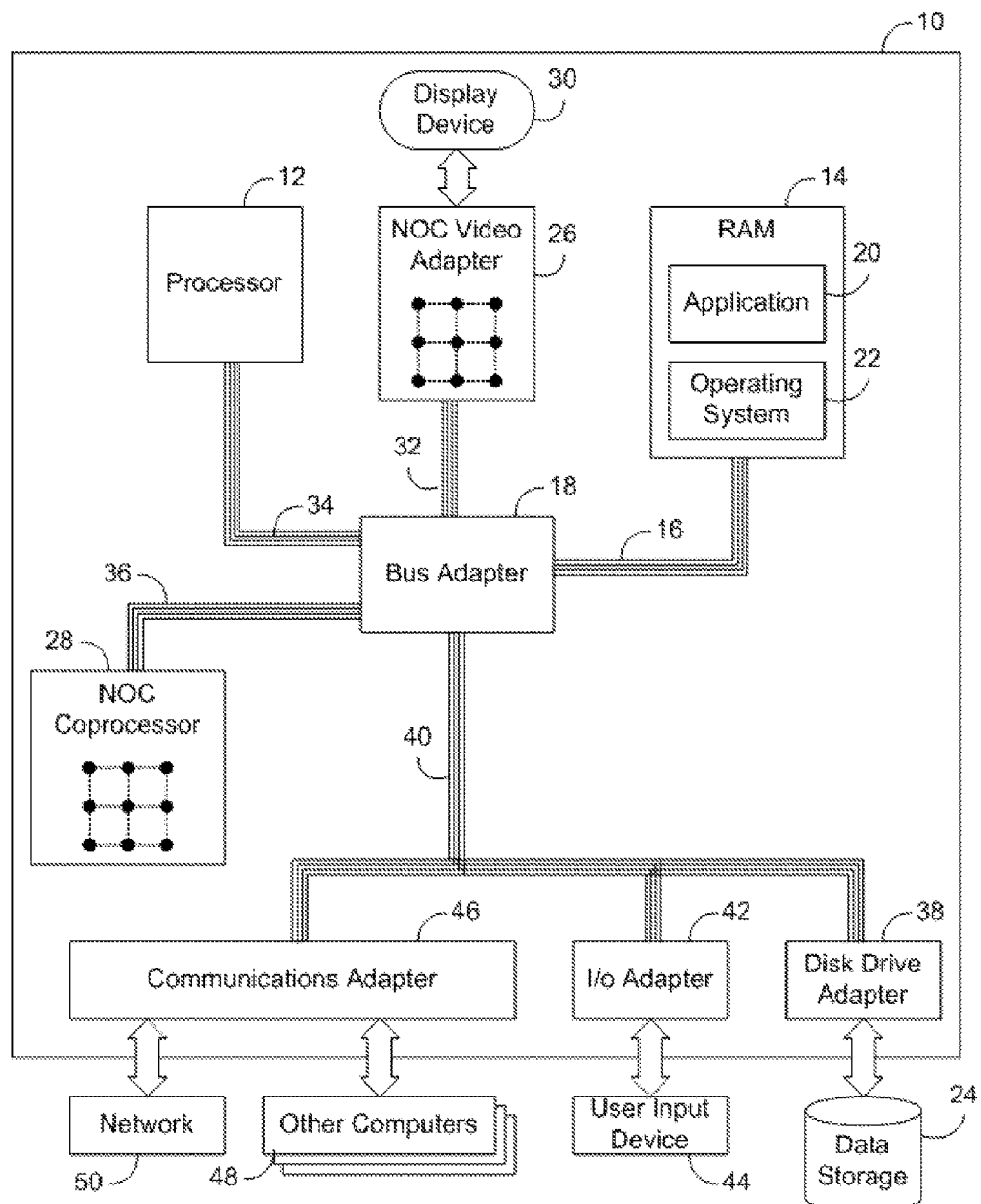
FIG. 1 is a block diagram of exemplary automated computing machinery including an exemplary computer useful in data processing in accordance with embodiments of the present invention.

Embodiments consistent with the invention facilitate operation for a hybrid pipeline to execute at least one instruction stream using out-of-order processing and in-order processing. The hybrid pipeline may select an out-of-order mode to execute instructions included in an instruction stream that may take advantage of the benefits of out-of-order processing and can assume the increased power consumption of out-of-order processing. The hybrid pipeline may select an in-order mode to execute instructions included in the instruction stream that may not benefit from out-of-order processing and may also have strict power requirements. Instructions included in the instruction stream may be selectively executed by the out-of-order and in-order modes within the single hybrid pipeline.

The hybrid pipeline may include a plurality of pipeline stages where each pipeline stage may be required for the out-of-order mode. However, a portion of the pipeline stages included in the hybrid pipeline that may be required for the out-of-order mode may not be required for the in-order mode. The pipeline stages not required for the in-order mode may be removed from the hybrid pipeline. The hybrid pipeline may dynamically switch between the out-of-order mode and the in-order mode by adding or removing the pipeline stages accordingly to or from the hybrid pipeline.

For example, in some embodiments of the invention, the plurality of pipeline stages may include a dispatch stage and an issue queue. The dispatch stage may be used in the out-of-order mode and the in-order mode. However, the issue queue may be used in the out-of-order mode but may not be needed for the in-order data mode. The issue queue may be removed from the hybrid pipeline for the in-order mode. The dispatch stage may be configured to dispatch instructions to the issue queue when the hybrid pipeline is in the out-of-order mode. However, the dispatch stage may be configured to dispatch instructions that bypass the issue queue when the hybrid pipeline is in the in-order mode. Other pipeline stages may be selectively activated and/or deactivated to effectively add and/or remove, respectively, the pipeline stages from the hybrid pipeline.

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
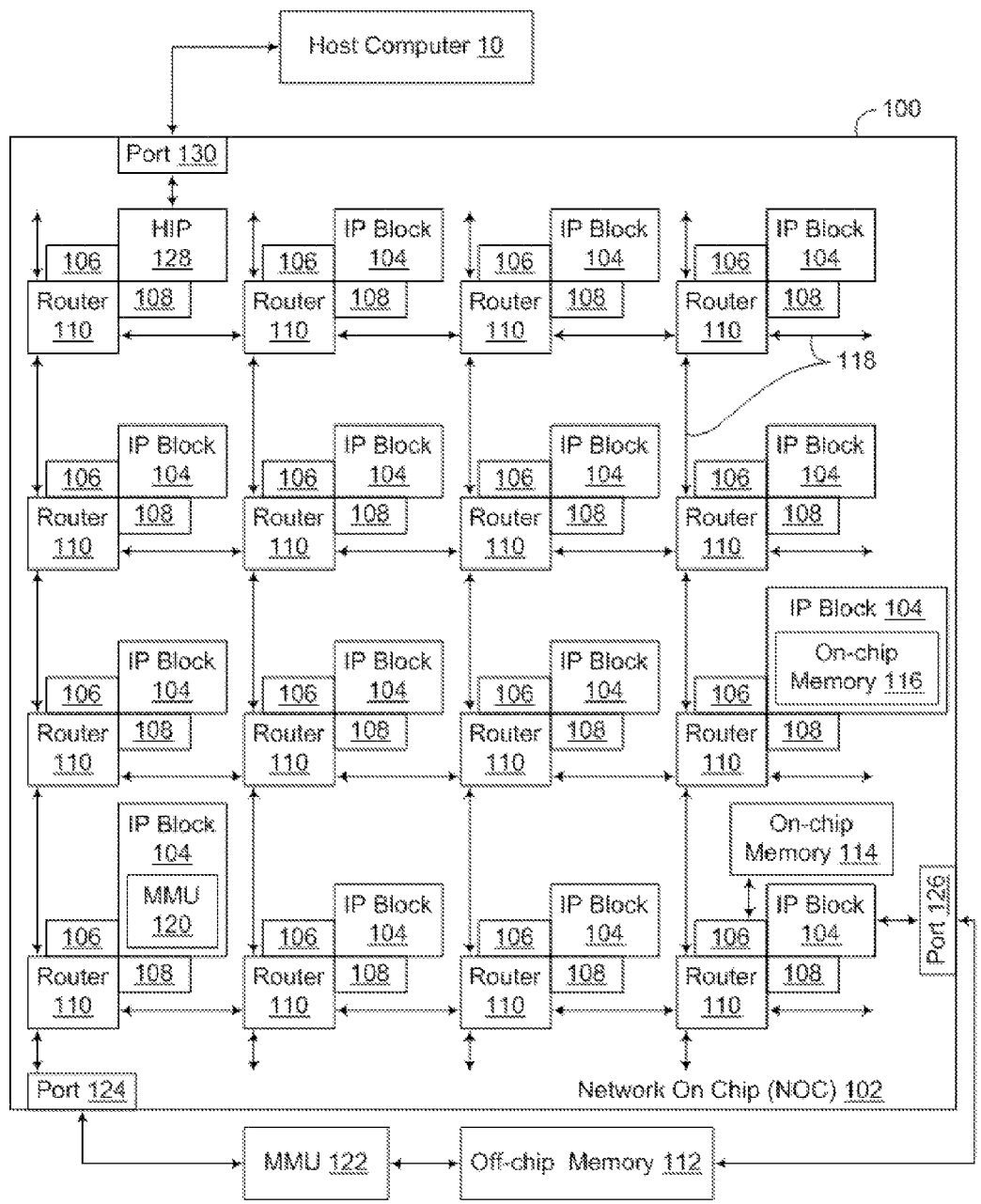
FIG. 2 is a block diagram of an exemplary NOC implemented in the computer of FIG. 1, in accordance with embodiments of the present invention.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 there between, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
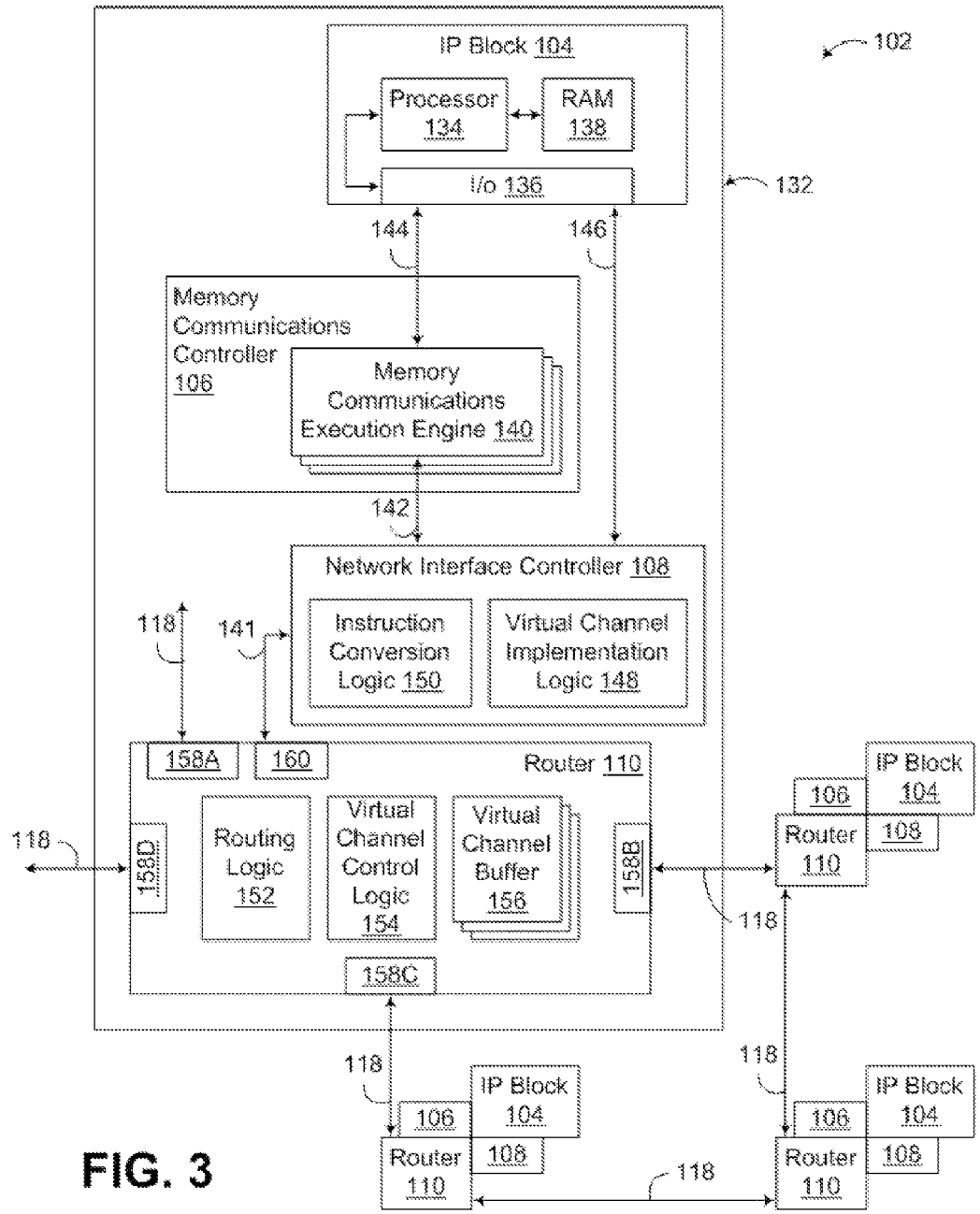
FIG. 3 is a block diagram illustrating in greater detail an exemplary implementation of a node from the NOC of FIG. 2, in accordance with embodiments of the present invention.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
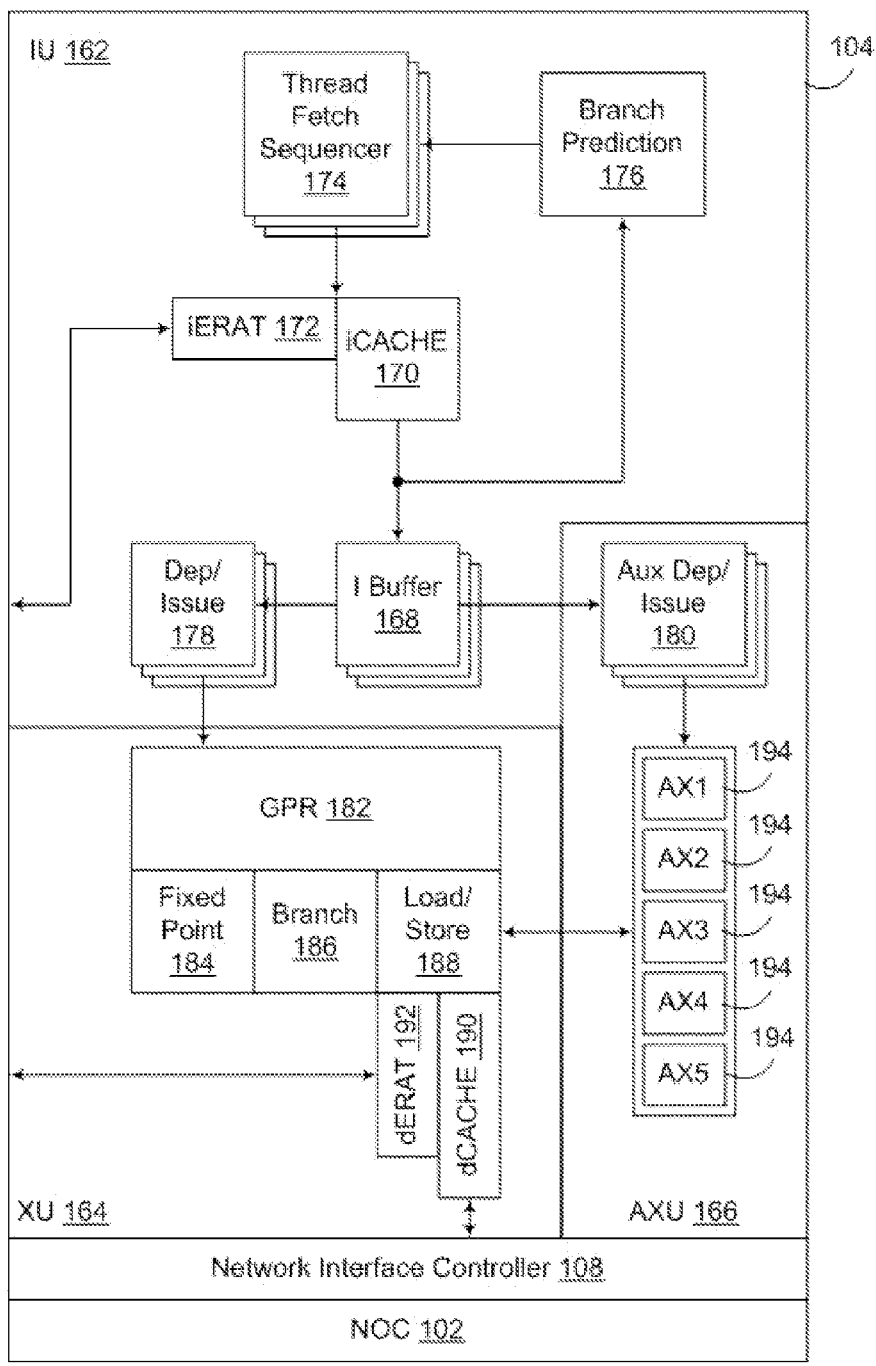
FIG. 4 is a block diagram illustrating an exemplary implementation of an IP block from the NOC of FIG. 2, in accordance with embodiments of the present invention.

FIG. 4 next illustrates in another manner one exemplary implementation of an IP block 104 consistent with the invention, implemented as a processing element partitioned into an issue or instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread are fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Out-of-Order Pipeline

Figure 5:
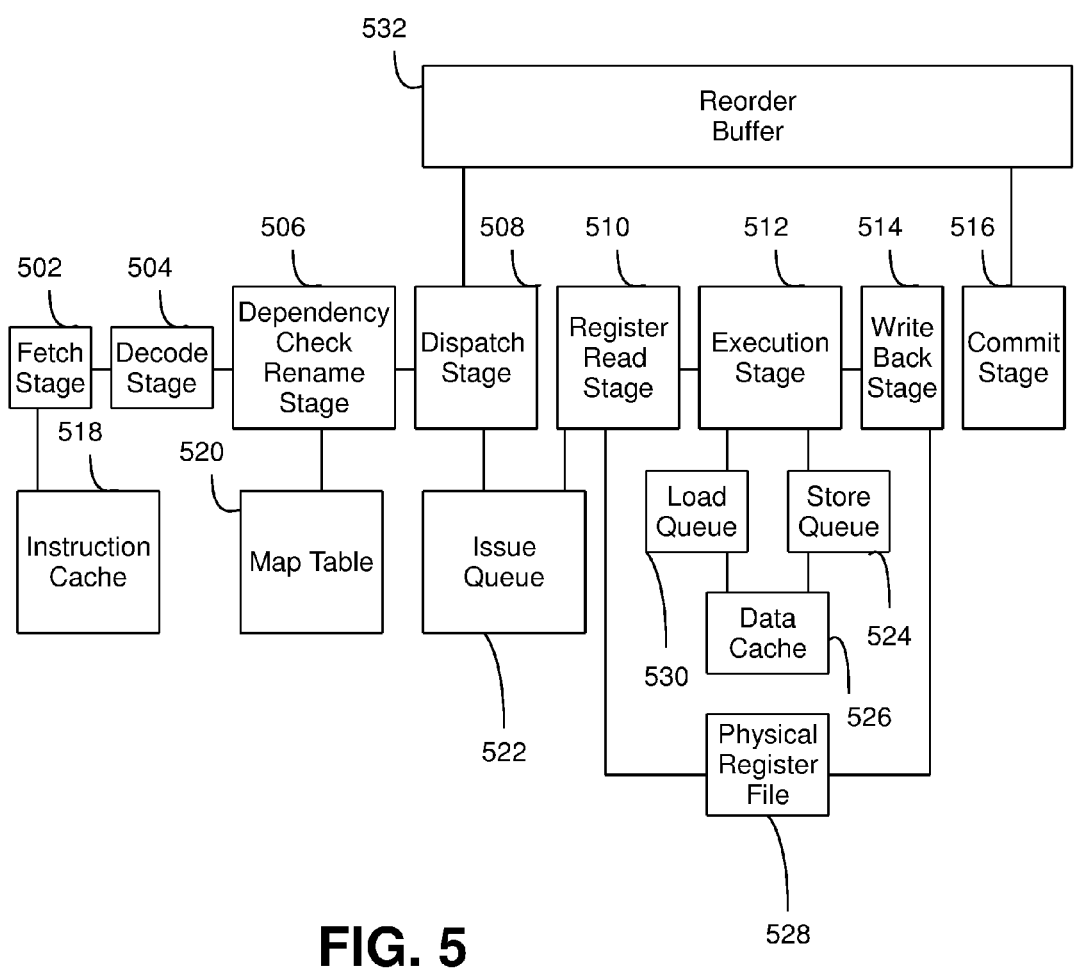
FIG. 5 is a block diagram of an out-of-order pipeline supporting out-of-order processing where instructions are processed out-of-order.

Turning now to FIG. 5, this figure illustrates an out-of-order pipeline 500 supporting out-of-order processing where instructions are processed out-of-order. The out-of-order pipeline 500 processes each instruction based on the readiness of each instruction to be executed. The out-of-order pipeline 500 does not sit idle when an instruction that is to be processed is not ready to be executed. Rather, the out-of-order pipeline 500 bypasses the instruction that is missing information and executes the next instruction that is ready to be executed. Out-of-order pipeline 500 includes a fetch stage 502, a decode stage 504, a dependency check rename stage 506, a dispatch stage 508, a register read stage 510, an execution stage 512, a write back stage 514, a commit stage 516, an instruction cache 518, a map table 520, an issue queue 522, a store queue 524, a data cache 526, a physical register file 528, a load queue 530, and a reorder buffer 532.

Out-of-order pipeline 500 depicts an example implementation of an out-of-order pipeline and the stages and/or structures that an out-of-order pipeline may include. As would be appreciated by one having skill in the relevant art(s), given the description herein, without departing from the spirit of embodiments herein, other examples of out-of-order pipelines may include additional combinations of the stages and/or structures referenced in FIG. 5 including additional stages and/or structures not referenced in FIG. 5 to obtain the capabilities for the out-of-order pipeline explained in detail below regarding out-of-order pipeline 500.

Fetch stage 502 retrieves an instruction stored in instruction cache 518. Instruction cache 518 stores copies of the instruction located in main memory so that fetch stage 502 retrieves a copy of the instruction from the instruction cache 518 rather than accessing a main memory for the instruction. Fetch stage 502 retrieves instructions from one or more instruction streams where fetch stage 502 retrieves more than one instruction per clock cycle. Decoder stage 504 interprets the instruction provided by fetch stage 502. Decode stage 504 interprets instructions from an instruction stream where decode stage 504 interprets more than one instruction per clock cycle.

Dependency check rename stage 506 renames the registers referenced by instructions to prevent write-after-write (WAW) and write-after-read (WAR) stalls. Dependency check rename stage 506 maps logical register names provided by a compiler into physical register names that are stored in physical register file 528. Dependency check rename stage 506 consults map table 520 to determine which physical registers correspond to the logical register names referenced in the instructions provided by decoder stage 504. Dependency check rename stage 506 may also allocate a new physical register for an instruction. Dependency check rename stage 506 updates map table 520 with the new physical register location for the instruction. Dependency check rename stage 506 may also perform a dependence cross-check of each instruction in a rename group. Dependency check rename stage 506 checks whether each younger instruction depends on an older instruction. Dependency check rename stage 506 updates map table 520 so that each younger instruction properly depends from each older instruction.

After the registers identified in each instruction have been renamed by dependency check rename stage 506, dispatching stage 508 dispatches each instruction into issue queue 522 where each instruction waits for its respective input operands to become available. An instruction becomes ready to execute when the input operands for the instruction become available. Issue queue 522 then issues each instruction that has received its respective input operands as ready to be executed. Register read stage 510 retrieves the contents of each register location corresponding to each input operand of each issued instruction and provides each issued instruction to execution stage 512 to be executed using the retrieved contents of the operand registers.

Execution unit 512 may be implemented as a number of different types of execution units, e.g., a generic fixed point or floating point unit, or a specialized execution unit such as a graphics processing unit, encryption/decryption unit, coprocessor, XML processing unit, or other execution unit, whether scalar or vector in nature. In addition, multiple execution units may be disposed in pipeline 500 such that multiple instructions may be issued per cycle.

As noted above, issue queue 522 dynamically issues each instruction for execution when the input operands for that instruction are available and the instruction is otherwise ready for execution rather than issuing each instruction in the order received by issue queue 522. As a result, multiple instructions may be issued per clock cycle and instructions may be executed out of order rather than in the order each instruction is received by issue queue 522. Delays in execution of instructions may be avoided. Instructions for which their respective input operands are not yet available may not be issued by issue queue 522 to be executed by execution stage 512. Rather, the next instructions awaiting execution in issue queue 522 that have available operands may be issued by issue queue 522 to be executed by execution stage 512 so that the instructions are executed out of order. The instructions that had previously been waiting on their respective input operands to become available may then be issued by issue queue 522 to be executed by execution stage 512 when each instruction is ready to proceed. The execution of instructions out of order prevents stalls from occurring that hinder the overall performance of out-of-order pipeline 500.

For example, instruction A is the next instruction to be executed. However, instruction A has a data cache miss and at least one operand is not available, so the instruction is not ready to be executed. Rather than wait for the operands for instruction A to become available resulting in a delay by out-of-order pipeline 500, issue queue 522 issues instruction B for execution by execution stage 512 because instruction B is the next instruction in issue queue 522 that has all input operands available. Issue queue 522 then issues instruction A to be executed by execution stage 512 when instruction A's respective input operands are available.

Execution stage 512 may buffer store instructions into store queue 524. Execution stage 512 may not commit store instructions to memory until the store instructions reach retirement. Rather, store instructions including the memory address and store data may be buffered in store queue 524 until they reach retirement. This avoids write-after-read (WAR) and write-after-write (WAW) dependency problems where an earlier load instruction receives an incorrect value from the memory because a later store instruction was allowed to execute before the earlier load instruction. Execution stage 512 buffers load instructions in a load queue until retirement. Execution stage 512 executes load instructions by accessing the location in memory and/or store queue 524 to obtain its data value and then the address and data for each load instruction are buffered in load queue 530. Execution stage 512 may read or write load instructions and store instructions to and from data cache 526 rather than memory to speed up the execution of load instructions and store instructions.

After each instruction has been executed by execution stage 512, the results of each executed instruction may be written to physical register file 528 by write back stage 514. Reorder buffer 532 reorders each executed instruction from the data order in which each instruction was executed to the program order in which each instruction was ordered in the original program code. Commit stage 516 then stores the results of each executed instruction based on the order provided by reorder buffer 532 to memory.

As noted above, out-of-order pipeline 500 is capable of issuing multiple instructions per cycle and completes instructions out-of-order which provides out-of-order pipeline 500 with an increased performance relative to an in-order pipeline for many types of workloads. However, this high performance potential comes with a price of high power consumption. Issue queue 522, load queue 530, store queue 524, physical register file 528, and commit stage 516 may be required specifically to support out-of-order execution of instructions. Issue queue 522, load queue 530, and store queue 524 in particular are expensive from an area and power perspective, and in many instances these components may account for as much as 25% percent of the power budget of the pipeline.

Some instruction streams benefit significantly from out-of-order processing and the power consumption committed to the out-of-order processing may be justified based on the high-performance achieved by the instruction streams. However, other instructions streams have execution patterns that cannot benefit from out-of-order processing and cannot justify the increased power consumption associated with out-of-order processing. For example, if an instruction stream includes instructions that form a single long dependence chain, if an instruction stream is bounded by branch mispredictions, or an instruction stream includes long-latency memory stalls, the benefits provided by the out-of-order processing of out-of-order pipeline 500 may be limited. As a result, in-order processing may be a more feasible alternative than out-of-order processing depending on the nature of the instructions included in the instruction stream.

In-Order Pipeline

Figure 6:
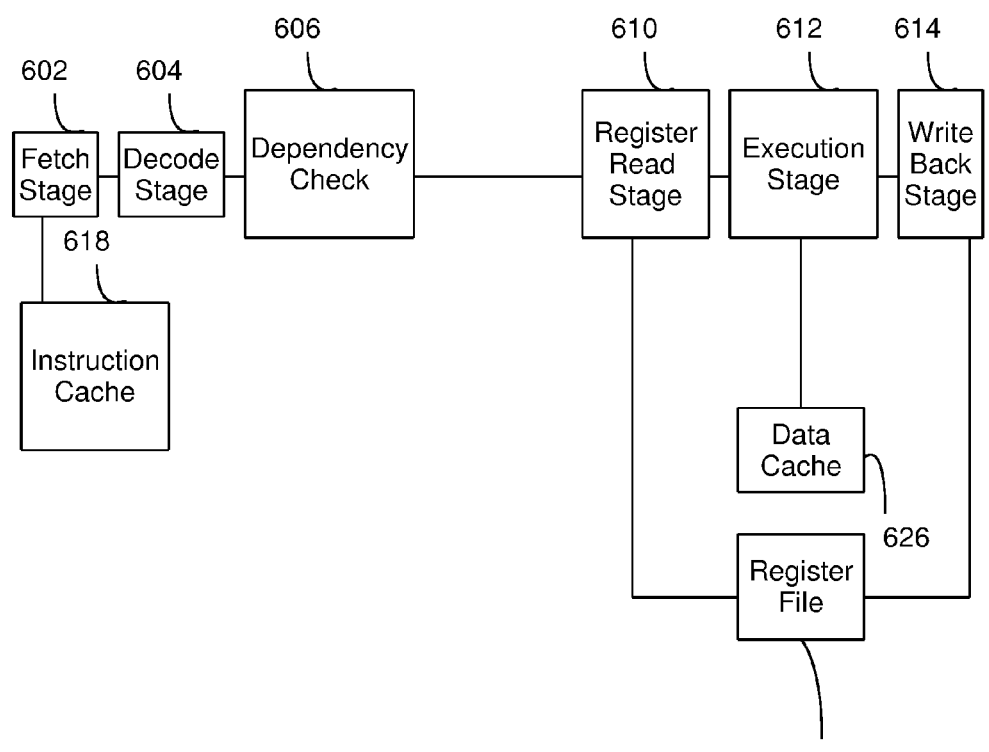
FIG. 6 is a block diagram of an in-order pipeline supporting in-order processing where instructions are processed in-order.

FIG. 6, in contrast, illustrates in-order pipeline 600 supporting in-order processing where instructions are processed in-order. In-order pipeline 600 fetches and executes instructions in the order provided by the program code. In-order pipeline 600 stalls when an instruction that is to be processed is not ready to be executed.

In-order pipeline 600 includes fetch stage 602, decode stage 604, dependency check stage 606, register read stage 610, execution stage 612, write-back stage 614, instruction cache 618, data cache 626, and register file 628. In-order pipeline 600 shares many similar features with out-of-order pipeline 500; therefore, only the differences between in-order pipeline 600 and out-of-order pipeline 500 are to be discussed in further detail.

Of note, in-order pipeline 600 omits a number of functional units included in out-of-order pipeline 500 that are used for out-of-order processing but are not necessary for in-order processing. For example, map table 520, dispatch stage 508, issue queue 522, commit stage 516, load queue 530, store queue 524, and reorder buffer 532 from out-of-order pipeline 500 are typically not needed for in-order pipeline 600.

Fetch stage 602 attempts to retrieve an instruction stored in instruction cache 618 that is next in line to be executed based on the program code. The instruction retrieved by fetch stage 602 may then be dispatched so that the retrieved instruction may be executed by execution stage 612 when the input operands are available for the instruction. However, in-order pipeline 600 stalls when the input operands for the retrieved instruction by fetch stage 602 are unavailable during the current clock cycle. In-order pipeline 600 does not attempt to execute other instructions that may already have input operands available and are ready to be processed. Rather, in-order pipeline 600 stalls until the input operands are available for the instruction. The instruction may then be dispatched to be executed by execution stage 612. Fetch stage 602 then attempts to retrieve the next instruction in line to be executed based on the program code.

In-order pipeline 600 may be the design of choice in many environments where power-efficiency is the primary goal, e.g., lower-end embedded systems, such as devices that operate on a battery for example, and/or large multi-core chips where the power budget for each core may be low due the quantity of cores requiring power. However, in-order pipeline 600 may have lower performance than out-of-order pipeline 500 for many workloads because no progress may be made while the input operands for an instruction are not available, such as during a data cache miss.

Some instruction streams may include one or more portions that benefit from the high-performance provided by an out-of-order pipeline and may be able to justify the increased power usage to obtain that high performance. However, other instruction streams may have strict power requirements and may not benefit from the high-performance provided by an out-of-order pipeline, whereby an in-order pipeline may be better suited for such instructions. As a result, embodiments consistent with the invention employ a single hybrid pipeline that dynamically switches between an out-of-order mode and in-order mode based on the requirements of each instruction stream being processed by the pipeline.

Hybrid Pipeline

Figure 7:
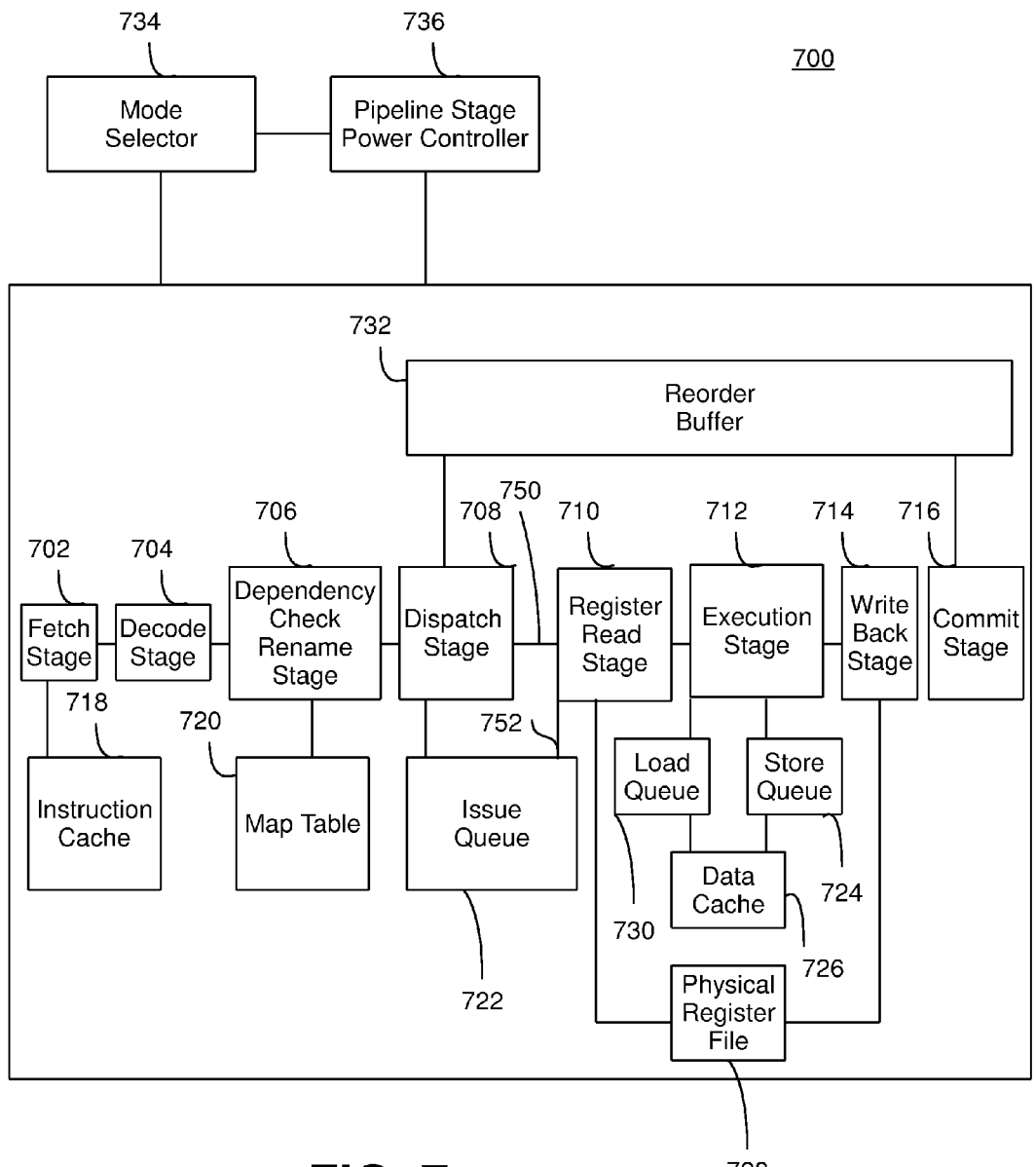
FIG. 7 is a block diagram illustrating an exemplary hybrid pipeline supporting both in-order and out-of-order processing, in accordance with embodiments of the present invention.

FIG. 7, in particular illustrates an exemplary hybrid pipeline 700 supporting both in-order processing when instruction streams are better suited to in-order processing and out-of-order processing when instruction streams are better suited to out-of-order processing. Hybrid pipeline 700 dynamically switches between an in-order mode and an out-of-order mode based on the processing requirements of each instruction stream being handled by the pipeline. Hybrid pipeline 700 includes fetch stage 702, decode stage 704, dependency check rename stage 706, dispatch stage 708, register read stage 710, execution stage 712, write back stage 714, commit stage 716, instruction cache 718, map table 720, issue queue 722, store queue 724, data cache 726, physical register file 728, load queue 730, reorder buffer 732, mode selector 734, and pipeline stage power controller 736. Hybrid pipeline 700 shares many similar features with out-of-order pipeline 500 and in-order pipeline 600; therefore, only the differences between hybrid pipeline 700 and in-order pipeline 600 and out-of-order pipeline 500 are to be discussed in further detail.

Hybrid pipeline 700 includes functional units required for hybrid pipeline 700 to operate in the out-of-order mode. For example, hybrid pipeline 700 includes fetch stage 702, decode stage 704, dependency check rename stage 706, dispatch stage 708, register read stage 710, execution stage 712, write back stage 714, commit stage 716, instruction cache 718, map table 720, issue queue 722, store queue 724, data cache 726, physical register file 728, load queue 730, and reorder buffer 732 to operate in the out-of-order mode. However, hybrid pipeline 700 does not use or require issue queue 722, load queue 730, store queue 724 and commit queue 716 to operate in the in-order mode. Hybrid pipeline 700 dynamically switches from the out-of-order mode to the in-order mode by deactivating issue queue 722, load queue 730, store queue 724, and commit stage 716. Hybrid pipeline dynamically switches from the in-order mode to the out-of-order mode by reactivating issue queue 722, load queue 730, store queue 724, and commit stage 716.

Mode selector 734 may dynamically select within which mode hybrid pipeline 700 may operate based on surveying upcoming instruction streams that are to be executed. Mode selector 734 may select the out-of-order mode when one or more upcoming instruction streams can benefit from the high-performance capabilities provided by the out-of-order mode and can justify the increased power required for the out-of-order mode. Mode selector 734 may then continue to survey upcoming instruction streams. Mode selector 734 may continue to maintain the out-of-order mode until any upcoming instruction streams have strict power requirements and will not likely benefit from the high-performance provided by the out-of-order mode. Mode selector 734 may then instruct hybrid pipeline 700 to be drained of instructions executed in the out-of-order mode. After hybrid pipeline 700 is drained of instructions executed in the out-of-order mode, mode selector 734 may dynamically switch hybrid pipeline 700 from the out-of-order mode to the in-order mode.

Pipeline stage power controller 736 may activate and/or deactivate functional units included in hybrid pipeline 700 based on the mode selected by mode selector 734. Pipeline stage power controller 736 may deactivate functional units not required for the in-order mode when mode selector 734 selects the in-order mode. Pipeline stage power controller 736 may activate functional units required for the out-of-order mode that may have been previously deactivated when hybrid pipeline 700 was operating in the in-order mode. As would be appreciated by one having skill in the relevant art(s), given the description herein, without departing from the spirit of embodiments herein, the functional units deactivated when switching from the out-of-order mode to the in-order mode may be gated off from the clock network, gated off from the remaining functional units, powered down, isolated on a power island and/or any other suitable deactivation method.

For example, mode selector 734 selects the out-of-order mode to execute one or more instruction streams. Pipeline stage power controller activates issue queue 722, load queue 730, store queue 724, and commit stage 716 so that hybrid pipeline 700 executes the instruction streams in the out-of-order mode. Mode selector 734 then selects the in-order mode to execute one or more instruction streams in the in-order mode. Pipeline stage power controller deactivates issue queue 722, load queue 730, store queue 724, and commit stage 716 so that each are bypassed in executing instruction streams in the in-order mode.

In an embodiment, directly issued instruction data path 750 may be activated when mode selector 734 dynamically selects the in-order mode. Issue queue instruction data path 752 may be deactivated when mode selector 734 dynamically selects the in-order mode. The activation of directly issued instruction data path 750 may enable instruction streams are to be executed in the in-order mode to bypass deactivated issue queue 722 and to directly issue to execution stage 712 in the order that each instruction is to be executed. Directly issued instruction data path 750 may be deactivated when mode selector 734 dynamically selects the out-of-order mode. Issue queue instruction data path 752 may be activated when mode selector 734 dynamically selects the out-of-order mode. The activation of issue queue instruction data path 752 may enable instructions that are to be executed in the out-of-order mode to be issued from issue queue 722 to execution stage 712 when each instruction is ready to be executed regardless of the order.

Renaming occurs in the out-of-order mode, for example, to reduce WAW and WAR stalls. However, renaming typically does not take place in the in-order mode. Hybrid pipeline 700 accounts for the discrepancy in the renaming procedure supported in the out-of-order mode but not supported in the in-order mode.

Figure 8:
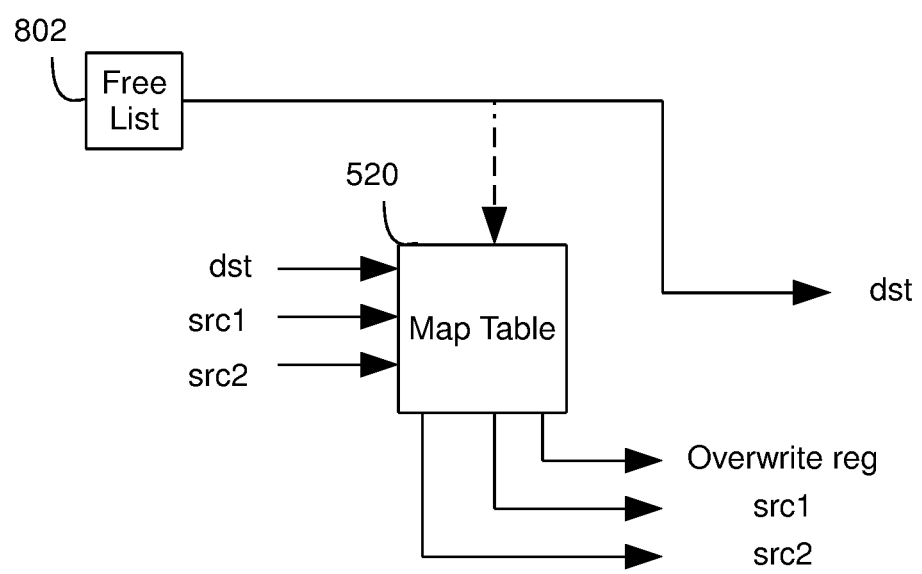
FIG. 8 is a block diagram illustrating an out-of-order renaming configuration.

FIG. 8, in particular illustrates an out-of-order renaming configuration 800. Out-of-order renaming configuration 800 includes map table 520 and free list 802. Free list 802 may be a structure storing a list of the available physical registers, which are not in use by any instruction currently executing in the processor As noted above, registers may be renamed, for example, to prevent WAW stalls and WAR stalls in out-of-order processing. Out-of-order renaming configuration 800 maps the logical register named by a compiler to physical register file 528 where a quantity of physical registers exceeds a quantity of logical registers. Map table 520 may be updated each time an instruction is renamed to determine which physical register includes the information from the logical register for the instruction. The instruction writes to a logical register, allocates a new physical register to hold the result of the instruction, and updates map table 520 to reflect the new mapping from the logical register to physical register file 528 for the instruction.

Figure 9:
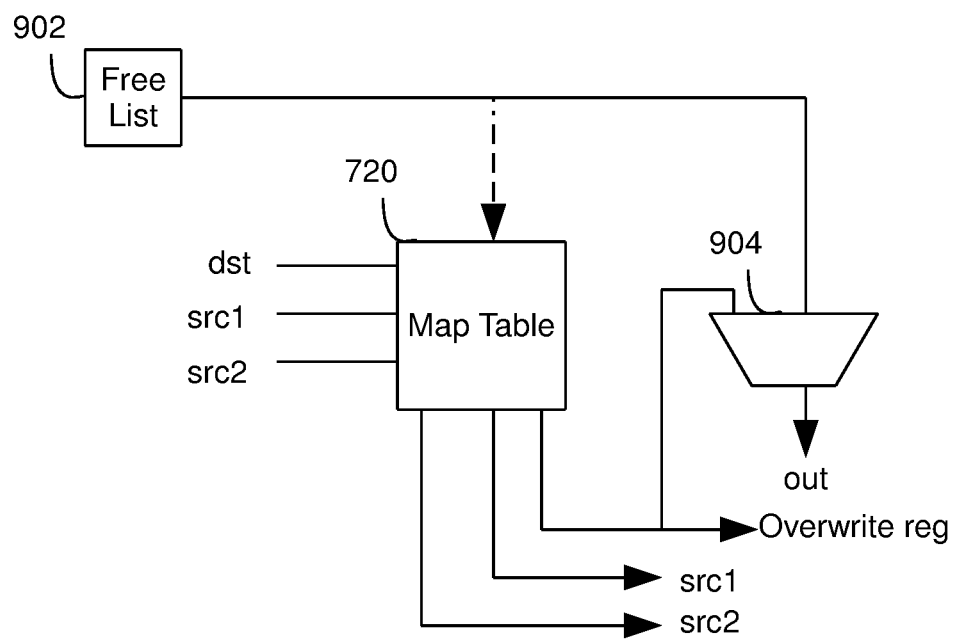
FIG. 9 is a block diagram illustrating an exemplary hybrid renaming configuration, in accordance with embodiments of the present invention.

However, as noted above, renaming is typically not required for in-order pipelines. FIG. 9, in particular illustrates an exemplary hybrid renaming configuration 900. Hybrid renaming configuration 900 includes map table 720, free list 902, and multiplexor 904. Hybrid renaming configuration 900 operates in a substantially similar fashion as out-of-order renaming configuration 800 when mode selector 734 dynamically selects the out-of-order mode for hybrid pipeline 700. However, in the in-order mode, hybrid renaming configuration 900 may not write to physical register file 728 a new location for the instruction to be executed but may read the current location of information for the instruction from map table 720. As instructions rename in the in-order mode, each instruction may read map table 720 to determine the location of each instruction's information and also the destination of each instruction. However, instructions in the in-order mode may not allocate a new physical register for their respective information.

Out-of-order renaming configuration 800 also performs a dependence cross-check on each group of instructions that is to be renamed to determine whether a more recent instruction depends on an older instruction so that the mappings included in mapping table 520 may include instructions that are correctly matched. Hybrid renaming configuration 900 includes a substantially similar dependence cross-check on each group of instructions that is to be renamed in the out-of-order mode. Hybrid renaming configuration 900 may detect dependent instructions included in each group of instructions that is to be renamed and stall each more recent instruction that depends on an older instruction in the in-order mode. For example, hybrid renaming configuration 900 may stall a subsequent instruction that reads the contents of a register updated by a previous instruction until the previous instruction has been executed. Stalling the subsequent instruction may prevent the second instruction from reading incorrect contents of the register that had yet to be updated by the previous instruction.

In an alternate embodiment, hybrid renaming configuration 900 may manage physical register file 728 with reference counting rather than free list 902. A finite state machine (FSM) may reorganize physical register file 728 whenever spare issue slots exist. Once physical register file 728 is appropriately reorganized to ensure the appropriate mapping, hybrid renaming configuration 900 may be powered off because map table 720 may no longer require being read. As a result, instructions may bypass dependency check rename stage 706 once the mapping is established. Further, unused portions of physical register file 728 may also be powered down to further reduce power consumption by hybrid pipeline 700.

In another embodiment, hybrid renaming configuration 900 may implement P6-style renaming. In such an embodiment, hybrid renaming configuration 900 may store values in an architected register file (ARF), and in-flight values may be stored in the entry included in reorder buffer 732 for the instruction that is writing to physical register file 728. After hybrid pipeline 700 drains, register values may be stored in the ARF which may be organized as execution stage 712 operating in the in-order mode may expect. As a result, mapping table 720 may properly translate logical registers to physical registers immediately so that hybrid renaming configuration 900 may be powered down.

Figure 10:
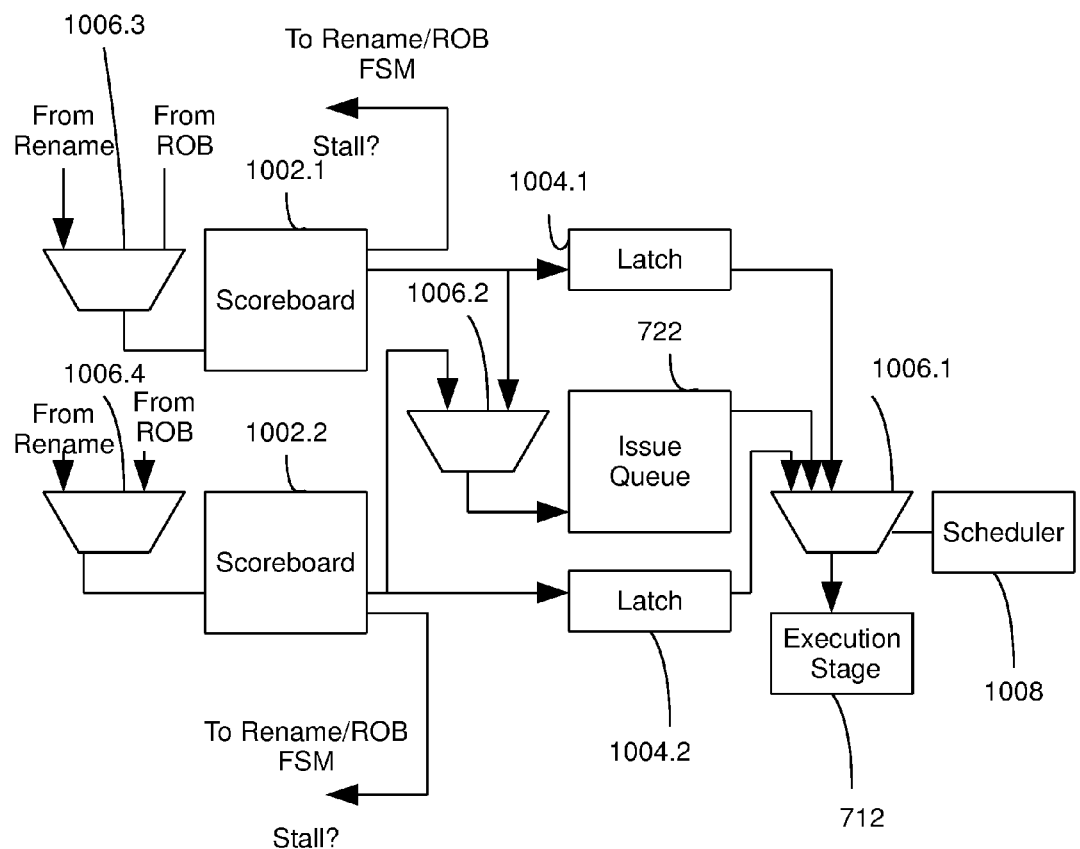
FIG. 10 is a block diagram illustrating an exemplary hybrid dispatch and issue configuration, in accordance with embodiments of the present invention.

As noted above, issue queue 722 included in hybrid pipeline 700 issues instructions to execution stage 712 when each instruction is ready to be executed in the out-of-order mode. Issue queue 722 is bypassed and instructions may be dispatched directly to execution stage 712 in the order provided by the program code in the in-order mode. FIG. 10, in particular illustrates an exemplary hybrid dispatch and issue configuration 1000. Hybrid dispatch and issue configuration 1000 bypasses issue queue 722 in the in-order mode and issues instructions to execution stage 712 via issue queue 722 in the out-of-order mode. Hybrid dispatch and issue configuration 1000 includes issue queue 722, execution stage 712, a plurality of scoreboards 1002.1 and 1002.2, a plurality of latches 1004.1 and 1004.2, a plurality of multiplexors 1006.1 through 1006.4, and a scheduler 1008.

Hybrid dispatch and issue configuration 1000 may dispatch and/or issue multiple instructions per clock cycle included in one or more instruction streams. Multiplexors 1006.3 and 1006.4 may be included at the start of the dispatch stage. Multiplexor 1006.3 may select instructions included in a first thread coming from dependency check rename stage 706 in the out-of-order mode and instructions included in the first thread coming from reorder buffer 732 in the in-order mode. Multiplexor 1006.4 may select between instructions included in a second thread coming from dependency check rename stage 706 in the out-of-order mode and instructions included in the second thread coming from reorder buffer 732 in the in-order mode.

The instructions included in the first thread and the second thread may consult scoreboards 1002.1 and 1002.2, respectively. Scoreboards 1002.1 and 1002.2 may determine the schedule in which each instruction may be executed. Scoreboards 1002.1 and 1002.2 may also determine whether each instruction may be issued by issue queue 722 in the out-of-order mode or bypass issue queue 722 in the in-order mode.

Scoreboards 1002.1 and 1002.2 may track each operand for each instruction that is to be executed in the out-of-order mode. Scoreboards 1002.1 and 1002.2 may determine when the input operands for the instructions that are to be executed in the out-of-order mode are available. Scoreboards 1002.1 and 1002.2 flag the instructions that are ready to be executed before dispatching the instructions to issue queue 722. Scoreboards 1002.1 and 1002.2 also flag the instructions that are not ready to be executed and do not dispatch the instructions not ready to be executed to issue queue 722.

Scoreboards 1002.1 and 1002.2 dispatch the instructions to be executed in the out-of-order mode directly to multiplexor 1006.2. Multiplexor 1006.2 selects which instructions from each thread to dispatch to issue queue 722. Some instructions may stall when each instruction stream combine to have more instructions than issue queue 722 has write ports. Each stalled instruction may be cycled back to dependency check rename stage 706 and monitored by scoreboards 1002.1 and 1002.2.

Scoreboards 1002.1 and 1002.2 may also track each operand for each instruction that is to be executed in the in-order mode. Scoreboards 1002.1 and 1002.2 may determine when the instructions that are to be executed in the in-order mode have received their respective input operands. Scoreboards 1002.1 and 1002.2 may stall the instructions that have not received their input operands and return the stalled instructions to reorder buffer 732.

Scoreboard 1002.1 may dispatch the instructions that are to be executed in the in-order mode and included in the first thread that are ready for execution directly to latch 1004.1 in the order provided by the program code. Scoreboard 1002.1 may bypass issue queue 722 in dispatching the instructions that are ready to be executed in the in-order mode directly to latch 1004.1. Scoreboard 1002.2 may dispatch the instructions that are to be executed in the in-order mode and included in the second thread that are ready for execution directly to latch 1004.2 in the order provided by the program code. Scoreboard 1002.2 may bypass issue queue 722 in dispatching the instructions that are ready to be executed in the in-order mode directly to latch 1004.2.

Scheduler 1008 may determine the order of each ready to be executed instruction is provided to execution stage 712 by multiplexor 1006.1. As noted above, several instructions operating in the out-of-order mode may be located in issue queue 722 and are ready to be executed by execution stage 712. Several instructions operating in the in-order mode may be located in plurality of latches 1004.1 and 1004.2 and are ready to be executed by execution stage 712. Scheduler 1008 may assess a quantity of out-of-order instructions located in issue queue 722 that are ready to be executed and a quantity of in-order instructions located in plurality of latches 1004.1 and 1004.2 that are ready to be executed. Based on these quantities, scheduler 1008 may prioritize the order of instructions to be executed by execution stage 712.

For example, hybrid pipeline 700 may be processing seven threads in the out-of-order mode and one thread in the in-order mode. Scheduler 1008 prioritizes instructions located in issue queue 722 that are ready to be executed at a faster rate by execution stage 712 than instructions located in plurality of latches 1004.1 and 1004.2. Scheduler 1008 prioritizes the execution of instructions located in issue queue 722 because of the greater quantity of instructions in the out-of-order mode that are to be executed compared to the quantity of instructions in the in-order mode.

Out-of-order pipeline 500 and in-order pipeline 600 speculate that loads are executed in their best case latency and are not delayed. As a result, other instructions that depend on older instructions are also not delayed in their execution because the older instructions from which they depend were not delayed. However, often times such speculations are incorrect and instructions are delayed so the speculations must be corrected. Out-of-order pipeline 500 recovers from load scheduling mis-speculations by not releasing instructions to issue queue 522 until the outcome of any relevant load latency speculation is known. An instruction that is delayed is reissued again at a later time by out-of-order pipeline 500. In-order pipeline 600 simply stalls instructions after a load scheduling mis-speculation.

Hybrid pipeline 700 may address load schedule mis-speculations by leaving reorder buffer 732 active in both the out-of-order mode and the in-order mode. Hybrid pipeline 700 may allocate instructions in both the in-order mode and the out-of-order mode that that are affected by load schedule mis-speculations to reorder buffer 732. Execution stage 712 may squash the execution of any in-flight instructions from the same thread that includes an instruction with a detected load schedule mis-speculation associated with the instruction. Execution stage 712 may squash the execution of the in-flight instructions prior to when the information included in the in-flight instructions are written back to physical register file 728 by write back stage 714 and any rename stall. After the load miss has been resolved, a FSM replays each instruction associated with the load miss out of reorder buffer 732. Each instruction associated with the load miss may re-enter dispatch stage 708. The status of each instruction associated with the load miss may be checked. Depending on the status, each instruction may be issued, executed, or stalled.

As noted above, hybrid pipeline 700 dynamically switches between in-order mode and out-of-order mode. In an embodiment, a compiler may include code that informs hybrid pipeline 700 whether in-order mode or out-of-order mode is more appropriate. The compiler could make the determination to dynamically switch by scheduling the code a first time and rating the performance of the execution of the instructions. The compiler may then schedule the code a second time to speculate the execution of the instructions in the out-of-order mode. The compiler may then compare the two schedules to determine what performance gains the out-of-order mode may obtain from the ability of hybrid pipeline 700 to speculate the execution of instructions in the out-of-order mode.

In another embodiment, hardware may make the determination for hybrid pipeline 700 to dynamically switch between the in-order mode and the out-of-order mode. The execution of each instruction in the in-order mode depends on the execution of the instruction immediately before it. Hardware may be configured to compare the execution time of a present instruction in the in-order mode to the projected issue time of the prior instruction in the out-of-order mode. The hardware may also account for other significant effects in transitioning between the out-of-order mode and the in-order mode such as the shortening of hybrid pipeline 700 in the in-order mode. The hardware may subtract the shortened length of hybrid pipeline 700 in the in-order mode to the added time to execute instructions in the in-order mode based on branch mis-predictions.

In an embodiment, hybrid pipeline 700 may be drained of out-of-order instructions when dynamically switching from out-of-order mode and hybrid pipeline 700 may be drained of in-order instructions when dynamically switching from in-order mode to out-of-order mode. Hybrid pipeline 700 may be drained of out-of-order instructions by stalling dependency check rename stage 706 until reorder buffer 732 is drained when dynamically switching from the out-of-order mode to the in-order mode. The stalling of dependency check rename stage 706 may have a minimal impact on the overall performance of hybrid pipeline 700. The in-order mode may resume after reorder buffer 732 has been drained of all out-of-order instructions. The out-of-order stages included in hybrid pipeline 700 that are not required for the in-order mode may then be gated and deactivated.

The out-of-order stages may then be powered on before the out-of-order mode may be resumed. Hybrid pipeline 700 may continue operating in the in-order mode while power is being restored to the out-of-order stages. After power is restored to the out-of-order stages, dependency check rename stage 706 may be stalled and reorder buffer 732 may be drained of in-order instructions. The out-of-order mode resumes after each in-order instruction is drained from reorder buffer 732.

In an embodiment, out-of-order stages not required for in-order mode may be isolated on a power island from the rest of the stages included in hybrid pipeline 700 that are required for both out-of-order mode and in-order mode. The out-of-order stages not required for in-order mode may be deactivated by simply cutting the power to the power island that isolates the out-of-order stages from the rest of the stages included in hybrid pipeline. For example, map table 720, issue queue 722, dispatch stage 708, load queue 730, store queue 724, and commit stage 716 are included on a power island that is isolated from fetch stage 702, decode stage 704, instruction cache 718, dependency check rename stage 706, register read stage 710, execution stage 712, write back stage 714, data cache 726, physical register file 728 and reorder buffer 732. Power is cut to the power island so that map table 720, issue queue 722, dispatch stage 708, load queue 730, store queue 724, and commit stage 716 are powered down when hybrid pipeline 700 dynamically switches from out-of-order mode to in-order mode.

In another embodiment, each execution unit included in execution stage 712 may be isolated on a power island from the rest of the stages included in hybrid pipeline 700. Not all execution units may be required in executing the instructions. For example, an arithmetic unit, a multiplier/divider unit, and/or a floating point unit may not be required in executed the instructions. As a result, power is cut to the power island so that the arithmetic unit, the multiplier/divider unit, and/or the floating point unit are powered down.

FIG. 11 is an illustration of an exemplary method 1100 of a hybrid pipeline that dynamically switches between out-of-order mode and in-order mode. As shown in FIG. 11, method 1100 begins at operation 1110 where at least one instruction stream is executed by the hybrid pipeline where the hybrid pipeline includes a plurality of stages. In an embodiment, as shown in FIG. 7, a hybrid pipeline, such as hybrid pipeline 700, executes at least one instruction stream where the hybrid pipeline includes a plurality of stages, such as fetch stage 702, decode stage 704, dependency check rename stage 706, dispatch stage 708, register read stage 710, execution stage 712, write back stage 714, commit stage 716, instruction cache 718, map table 720, issue queue 722, load queue 730, store queue 724, data cache 726, physical register file 728 and reorder buffer 732. Once operation 1110 is complete, method 1100 proceeds to operation 1120.

At operation 1120, instructions are dispatched to an issue queue when the hybrid pipeline is in an out-of-order mode. In an embodiment, as shown in FIG. 7, a dispatch stage, such as dispatch stage 708, dispatches instructions to an issue queue, such as issue queue 722, when the hybrid pipeline, such as hybrid pipeline 700, is in an out-of-order mode. Once operation 1120 is complete, method 1100 proceeds to operation 1130.

At operation 1130, the issue queue is bypassed when the hybrid pipeline is an in-order mode. In an embodiment, as shown in FIG. 7, the issue queue, such as issue queue 722, is bypassed when the hybrid pipeline, such as hybrid pipeline 700, is an in-order mode. Once operation 1130 is complete, method 1100 proceeds to operation 1140.

At operation 1140, the hybrid pipeline dynamically switches between the out-of-order and in-order modes to selectively execute instructions from the at least one instruction stream using out-of-order and in-order pipeline processing. In an embodiment, as shown in FIG. 7, the hybrid pipeline, such as hybrid pipeline 700, dynamically switches between the out-of-order and in-order modes to selectively execute instructions from the at-least one instruction stream using out-of-order processing and in-order processing. Once operation 1140 is completed, method 1100 ends.

The foregoing description of the specific embodiments will so fully reveal the general nature of the present invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not limitation, such that the terminology or phraseology of the specification is to be interpreted by the skilled artisan in light of the teachings and guidance.

Therefore, embodiments consistent with the invention may be used to provide a single hybrid pipeline to dynamically switch between out-of-order and in-order modes. In many embodiments, this may permit the single hybrid pipeline to avoid the introduction of latency overhead associated with moving different portions of applications between different cores or execution units, or between an out-of-order pipeline and an in-order pipeline. Embodiments of the single hybrid pipeline may also avoid the increase in power consumption and resource usage, and thus reduction in performance from simultaneously executing multiple copies of an application in an out-of-order pipeline and in-order pipeline.

The breadth and scope of the present invention should not be limited by any of the above-described exemplary embodiments, but should be defined only in accordance with the claims and their equivalents.

What is claimed is:

1. A circuit arrangement, comprising:
a hybrid pipeline including a plurality of pipeline stages configured to execute at least one instruction stream, wherein the plurality of pipeline stages includes a dispatch stage, wherein the dispatch stage is configured to dispatch instructions to an issue queue when the hybrid pipeline is in an out-of-order mode, and wherein the dispatch stage is configured to bypass the issue queue when the hybrid pipeline is in an in-order mode; and
control logic coupled to the hybrid pipeline and configured to dynamically switch the hybrid pipeline between the out-of-order and in-order modes to selectively execute instructions from the at least one instruction stream using out-of-order and in-order pipeline processing, wherein the dispatch stage is further configured to:
assess a quantity of out-of-order instructions located in the issue queue and awaiting execution by the execution unit;
assess a quantity of in-order instructions that have bypassed the issue queue and that are located in at least one latch and awaiting execution by the execution unit; and
prioritize an execution order of a first, out-of-order instruction located in the issue queue over a second, in-order instruction located in the at least one latch to be executed by the execution unit based on the assessed quantity of out-of-order instructions being greater than the assessed quantity of in-order instructions such that the first, out-of-order instruction is executed by the execution unit before the second, in-order instruction.

2. The circuit arrangement of claim 1, wherein each pipeline stage from the plurality of pipeline stages is used in executing out-of-order instructions when the hybrid pipeline is in the out-of-order mode.

3. The circuit arrangement of claim 1, wherein a portion of pipeline stages from the plurality of pipeline stages are not used in executing in-order instructions when the hybrid pipeline is in the in-order mode.

4. The circuit arrangement of claim 3, further comprising:
a pipeline stage power controller configured to:
deactivate each pipeline stage from the plurality of pipeline stages that is not used in executing the in-order instructions to dynamically switch the hybrid pipeline from the out-of-order mode to the in-order mode, and
reactivate each deactivated pipeline stage in executing the out-of-order instructions to dynamically switch the hybrid pipeline from the in-order mode to the out-of-order mode.

5. The circuit arrangement of claim 4, wherein the pipeline stage power controller is further configured to:
deactivate the issue queue when the hybrid pipeline is dynamically switched from the out-of-order mode to the in-order mode; and
activate the issue queue when the hybrid pipeline is dynamically switched from the in-order mode to the out-of-order mode.

6. The circuit arrangement of claim 5, wherein the dispatch stage is further configured to dispatch each out-of-order instruction to the activated issue queue to await issuance to an activated execution unit included in the hybrid pipeline when in the out-of-order mode.

7. The circuit arrangement of claim 1, further comprising: rename logic configured to:
enable an out-of-order instruction that is renaming a register location to locate to a new physical register and update a map table to reflect an updated location of the out-of-order instruction based on the location of the new physical register when the hybrid pipeline is in the out-of-order mode,
enable an in-order instruction that is renaming a register location to read the map table to determine the register location for the in-order instruction when the hybrid pipeline is in the in-order mode, and
prevent the in-order instruction that is renaming the register location to locate to a new physical register when the hybrid pipeline is in the in-order mode.

8. The circuit arrangement of claim 1, wherein the dispatch stage is further configured to:
maintain a reorder buffer active when the hybrid pipeline is in the out-of-order mode and when the hybrid pipeline is in the in-order mode;
allocate each in-order instruction and each out-of-order instruction that is included in incorrect load speculations to the reorder buffer;
squash an execution of each in-flight instruction associated with each thread that includes each in-order instruction and each out-of-order instruction included in the incorrect load speculations; and
replay each in-order data instruction and each out-of-order data instruction that were included in the incorrect load speculations from the reorder buffer after each incorrect load speculation is returned.

9. The circuit arrangement of claim 8, wherein the dispatch stage is further configured to flush the reorder buffer of each out-of-order instruction stored in the reorder buffer when the hybrid pipeline is transitioned from the out-of-order mode to the in-order mode.

10. The circuit arrangement of claim 9, wherein the pipeline stage power controller is further configured to deactivate each pipeline stage from the plurality of pipeline stages that is not used in executing the in-order instructions after each out-of-order instruction stored in the reorder buffer is flushed from the reorder buffer.

11. The circuit arrangement of claim 1, wherein the hybrid pipeline is configured to consume less power when in the in-order mode than when in the out-of-order mode.

12. The circuit arrangement of claim 1, wherein each pipeline stage that is deactivated when the hybrid pipeline is in the in-order mode is located on a power island isolated from each pipeline stage that is not deactivated when the hybrid pipeline is in the in-order mode.

13. A method to facilitate operation for a hybrid pipeline to execute at least one instruction stream using out-of-order processing and in-order processing, comprising:
executing, by the hybrid pipeline, at least one instruction stream, wherein the hybrid pipeline includes a plurality of stages;
dispatching instructions to an issue queue when the hybrid pipeline is in an out-of-order mode;
bypassing the issue queue when the hybrid pipeline is in an in-order mode; and
dynamically switching the hybrid pipeline between the out-of-order and the in-order modes to selectively execute instructions from the at least one instruction stream using out-of-order and in-order pipeline processing,
wherein dispatching further comprises:
assessing a quantity of out-of-order instructions located in the issue queue and awaiting execution by the execution unit;
assessing a quantity of in-order instructions that have bypassed the issue queue and are located in at least one latch and awaiting execution by the execution unit; and
prioritizing an execution order of a first, out-of-order instruction located in the issue queue over a second, in-order instruction located in the at least one latch to be executed by the execution unit based on the assessed
quantity of out-of-order instructions being greater than the assessed quantity of in-order instructions such that the first, out-of-order instruction is executed by the execution unit before the second, in-order instruction.

14. The method of claim 13, wherein each pipeline stage from the plurality of pipeline stages is used in executing out-of-order instructions when the hybrid pipeline is in the out-of-order mode.

15. The method of claim 13, wherein a portion of pipeline stages from the plurality of pipeline stages are not used in executing in-order instructions when the hybrid pipeline is in the in-order mode.

16. The method of claim 15, further comprising:
deactivating each pipeline stage from the plurality of pipeline stages that is not used in executing the in-order instructions to dynamically switch the hybrid pipeline from the out-of-order mode to the in-order mode; and reactivating each deactivated pipeline stage in executing the out-of-order instructions to dynamically switch the hybrid pipeline from the in-order mode to the out-of-order mode.

17. The method of claim 16, further comprising:
deactivating the issue queue when the hybrid pipeline is dynamically switched from the out-of-order mode to the in-order mode; and
activating the issue queue when the hybrid pipeline is dynamically switched from the in-order mode to the out-of-order mode.

18. The method of claim 17, further comprising:
dispatching each out-of-order instruction to the activated issue queue to await issuance to an activated execution unit included in the hybrid pipeline when in the out-of-order mode.

19. The method of claim 13, further comprising:
enabling an out-of-order instruction that is renaming a register location to locate to a new physical register and update a map table to reflect an updated location of the out-of-order instruction based on the location of the new physical register when the hybrid pipeline is in the out-of-order mode;
enabling an in-order instruction that is renaming a register location to read the map table to determine the register location for the in-order instruction when the hybrid pipeline is in the in-order mode; and
preventing the in-order instruction that is renaming the register location when to locate to a new physical register when the hybrid pipeline is in the in-order mode.

20. The method of claim 13, wherein the dispatching further comprises:
maintaining a reorder buffer active when the hybrid pipeline is in the out-of-order mode and when the hybrid pipeline is in the in-order mode;
allocating each in-order instruction and each out-of-order instruction that is included in incorrect load speculations to the reorder buffer;
squashing an execution of each in-flight instruction with each thread that includes each in-order instruction and each out-of-order instruction included in the incorrect load speculations; and
replaying each in-order data instruction and each out-of-order data instruction that were included in the incorrect load speculations from the reorder buffer after each incorrect load speculation is returned.

21. The method of claim 20, further comprising:
flushing the reorder buffer of each out-of-order instruction stored in the reorder buffer when the hybrid pipeline is transitioned from the out-of-order mode to the in-order mode.

22. The method of claim 21, further comprising:
deactivating each pipeline stage from the plurality of pipeline stages that is not required in executing the in-order instructions after each out-of-order instruction stored in the reorder buffer is flushed from the reorder buffer.

* * * * *